UNITED STATES PATENT OFFICE.

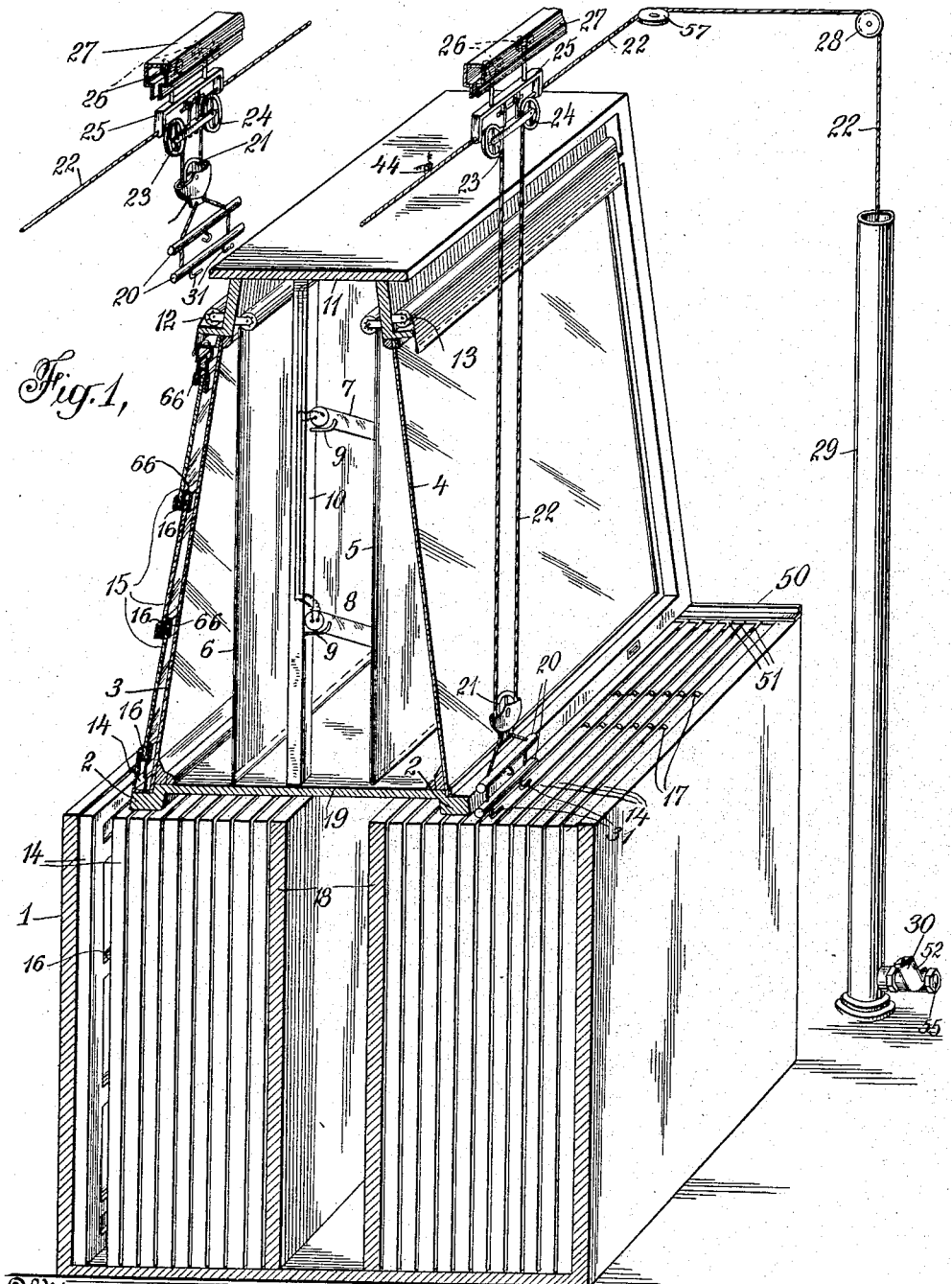

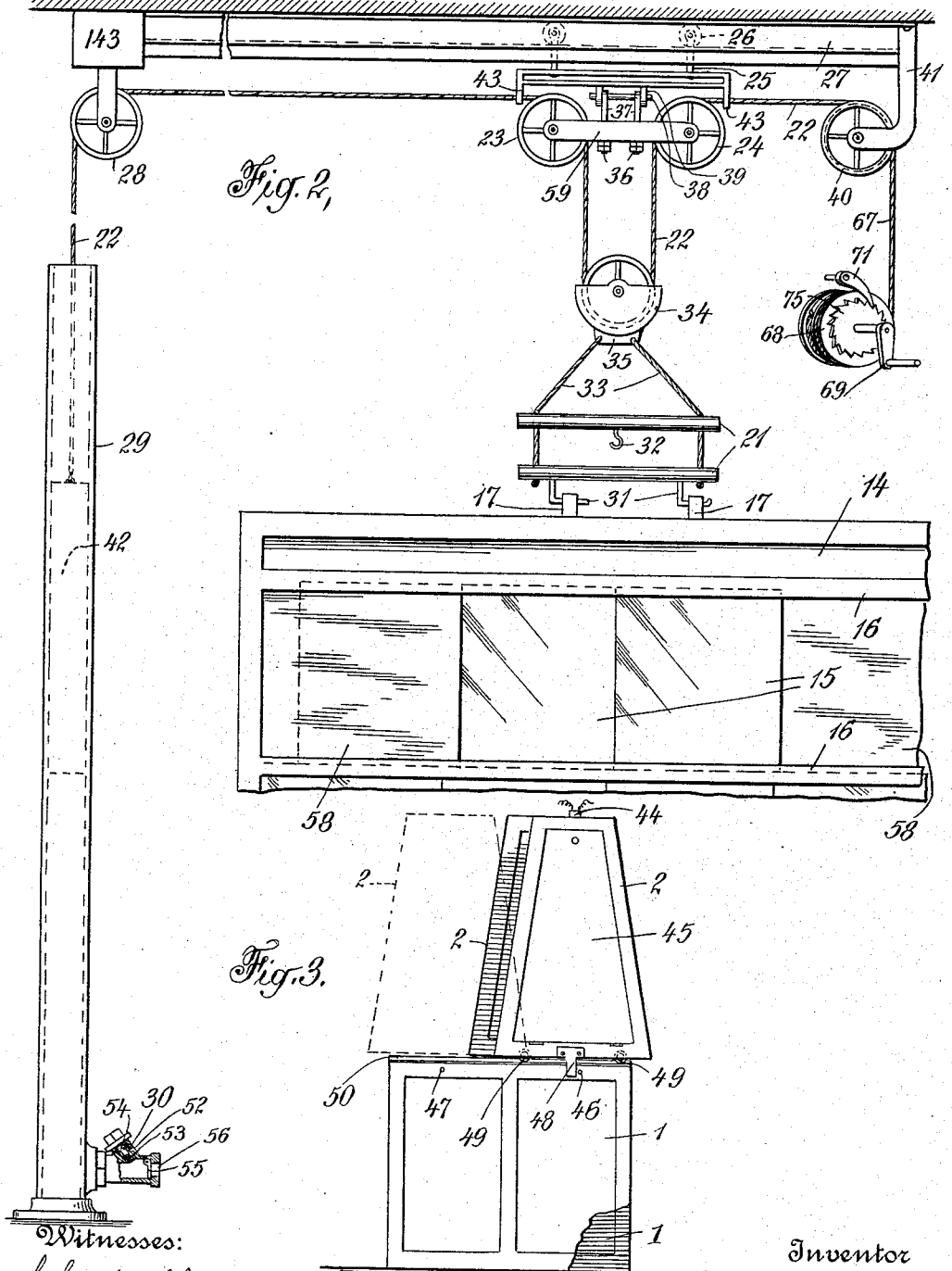

EUGENE W. CALDWELL, OF NEW YORK, N. Y.

ILLUMINATING AND STORING APPARATUS.

1,172,426. Specification of Letters Patent. Patented Feb. 22, 1916.

Application filed July 2, 1915. Serial No. 37,784.

*To all whom it may concern:*

Be it known that I, EUGENE W. CALDWELL, a citizen of the United States, and resident of the city, county, and State of New York, have made a certain new and useful Invention Relating to Illuminating and Storing Apparatus, of which the following is a specification, taken in connection with the accompanying drawings, which form part of the same.

This invention relates especially to illuminating and storing apparatus for X-ray negatives which may comprise one or more movable illuminating supports containing suitable lights and diffusing devices and an inclined recessed frame support in which any one of a series of interchangeable transparency frames may be supported in inclined position adjacent the illuminating surface so that the X-ray negatives or other transparencies temporarily held in the frame may be viewed and compared with others in similar frames in adjacent illuminating supports, for instance. The supports are preferably mounted so as to be transversely movable upon a series of longitudinally alined bases comprising one or more frame storage racks in which the interchangeable frames may be stored and withdrawn as desired, preferably by a suitable automatic raising and lifting device which is adapted to raise them from the racks for use in one of the illuminating supports and which allow the movement of any frame along the supports to the desired extent.

In the accompanying drawing showing in a somewhat diagrammatic way illustrative embodiments of this invention, Figure 1 is a somewhat diagrammatic perspective view, the nearer supports and bases being omitted and parts being shown in section. Fig. 2 is an enlarged view showing the lifting device and adjacent parts of the frame; and Fig. 3 is an end elevation showing the transverse movement of the illuminating supports.

The movable illuminating support may be of any desired construction and may, for example, be in the form of an inclosed box having a diffusing illuminating surface such as the ground glass 4 on one or both sides preferably arranged in somewhat inclined position adjacent the inclined recessed frame support 2. The support or lighting box may have the top 11 and bottom 19 to prevent leakage of light and similarly opaque ends, such as 45 shown in Fig. 3, a similarly inclined illuminating surface 3 being provided on the opposite side of the support, if desired. Any desired form of illuminating device, such, for instance, as the mercury lights 7, 8, may be arranged at the desired point or points within the illuminating support and supplied with electricity or other form of energy through the lighting wires 44, for example. Still further diffusion of the light may be secured by the use of internal diffusing devices or shades, such as 5, 6, which may be mounted on rollers so as to be arranged at the height desired and assist in the diffusion of the light before it strikes the outer diffusing illuminating surfaces 3, 4. The support is preferably so arranged as to coöperate with any one of a number of interchangeable transparency frames 14 which with advantage may be made so as to fit sufficiently snugly within the recessed frame support adjacent the illuminating surface so as to prevent or minimize leakage of light around the edges of the frame. It is also desirable to have suitable cut-off devices, such as the opaque curtains 12, 13, mounted adjacent one or more edges of the illuminating surface so that they may be drawn part way over the frame in use and shut off such parts of the same as are not being used.

A suitable transparency frame for use in connection with such an illuminating support may be made of any desired material and construction and may as indicated at the left of Fig. 1 comprise an outer corrugated or other strengthening edge 14 formed of heavy galvanized iron or other sheet metal to give the desired stiffness and strength and one or more transverse holding strips may be adjustably mounted in the frame each comprising a holding slot or socket 16 and an upper retaining or guiding slot or socket 66 within which the X-ray negatives or other transparencies may fit sufficiently loosely so that they can be inserted therein and pushed up far enough for insertion into the holding slot below so that they may be retained in position in the frame as long as desired and readily removed or inserted therein. It is not necessary in all cases that the bars or holding devices to accommodate the plates shall be arranged at the same height in the frames or be permanently mounted therein and it is also of advantage in order to more readily accommodate plates of different sizes to sometimes use additional removable kits or reducing frames such as are commonly used in photographic work which may have such sized openings as to accommodate the particular plates to be used while their outside dimensions are such as to fit within the frame strips. It is highly desirable to store a number of such X-ray negatives adjacent the illuminating support or device and for this purpose it is desirable to form suitable storage racks adjacent the illuminating support, as for instance, within the base or cabinet on which the support may be mounted. As shown in Figs. 1 and 3 this base or cabinet 1 may be formed with suitable tracks 50 on which the bearing wheels or rollers 49 of the support may rest, the transverse movement of the support on the base being limited by any suitable means, as for instance by the depending lug 48 on the base which coöperates with the stop pins 46, 47 to allow the extent of movement indicated by the full and dotted lines in Fig. 3. In this way a large part of the top of this base may readily be exposed and the frames stored or arranged between the guide ribs or clips 51 may be withdrawn by any desired means and used in connection with the illuminating support.

A convenient lifting device for this purpose may be mounted adjacent one or both sides of the support and may comprise, for example, a suitable traveling carriage 43 mounted by the stems 25 of the trolley wheels 26 which coöperate with a suitable track 27 of the inclosed type, for instance, so that the carriage can freely move longitudinally of the one or more illuminating supports which may be arranged with their bases in line along the length of the room. The carriage 43 is preferably provided with a swinging hanger such as 59 which may swing or swivel about the pin 38 connecting the carriage lugs 39 with the hanger lugs or supports 37 which may if desired be secured thereto by the adjusting nuts 36. A suitable compensating lifting connection may be secured in this way by mounting a continuous cord 22 which preferably extends through guiding apertures approximately in line with the pivot 38 so as to pass over suitable pulleys 23, 24, in the hanger and around the lifting pulley 21 so that pulling on one end of the cord raises the lifting pulley and connected lifting device, while at the same time the cord is so arranged in connection with the pulleys that the entire traveling carriage may be moved longitudinally along the track without raising the lifting device if the ends of the cord remain stationary. As indicated one end of the cord 22 may be secured about a suitable guiding or holding device 40 in the bracket 41 adjacent one end of the track and the other end of the cord may pass around the pulley, such as 28, mounted in a support 143 adjacent the other end of the track so as to preferably coöperate with a suitable cushioning device, such as the lifting weight 42 on the end of the cord which may operate in a pneumatic or other cushioning cylinder 29 so that the lifting device normally has an automatically raising action, while at the same time its undesirably rapid raising is cushioned by the air dashpot action of the cushioning cylinder and relatively tight fitting lifting weight therein in connection, if desired, with suitable throttling cushioning valves. These valves may as indicated in Figs. 1 and 2 comprise the cushioning check valve 55 which as the weight descends tends to close the relief aperture 56 so that the further escape of air must take place in limited quantities either past the lifting weight 42 or past a suitable throttling device or valve, such as 54, having a needle point end to control the aperture 53 and limit the amount of air which escapes through the aperture 52 in this connection 30.

The lifting device may comprise one or more suitable handles or connections which may be connected with the pulley frame 34 or other part such as the connected lug 35 as by the flexible cables or cords 33 if desired, so that a somewhat greater freedom of movement of the lifting hooks 31 is thus secured by which they can be more readily inserted or withdrawn from the coöperating lifting clips 17 formed on the frames 14. The operator forcibly pulls down the lifting device so that the lifting hooks 31 are inserted in the lifting clips on the transparency frame desired, one of these hooks preferably being formed with a suitable retainer, such as the upturned retainer end 61 which prevents accidental disengagement of the parts. The operator can then release the lifting device so that the connected lifting weight 42 gradually lifts the frame and normally holds it in raised position so that it can be moved along the track into alinement with the desired illuminating support and be lowered into engagement with any one of the inclined recessed frame supports. It is sometimes more desirable in order to facilitate the raising of the lifting device and attached frame to have one end of the cord, preferably the end opposite from the end to which the lifting weight is attached, arranged in coöperation with a suitable power or other lifting device, such, for instance, as the hoisting drum and connected crank which may be used to slowly lift the frame with the expenditure of less power than directly depressing the hooks of the lifting device as previously described. In this way the lifting device can be positively lowered from its normally raised position and then after the frame is secured thereto the frame and lifting device may readily be raised to the desired extent with the expenditure of relatively little power, and with this arrangement the excessive operation of the lifting drum merely raises the counterweight without otherwise injuring the apparatus. The X-ray negatives or other transparencies 15 which have been previously inserted in this frame can thus be studied under advantageous conditions and their indications compared with those of the other transparencies in the frame or in the adjacent frames and the illuminating support can be readily moved transversely on its base so that the transparencies under observation can be moved to the desired distance from the observer's eyes. In this work it is often of advantage to blank out some of the transparencies and this may be readily accomplished by slipping in opaque slides, such as 58, either over negatives which are in place in the frame or to fill in unoccupied spaces therein and the opaque curtain, such as 13, may also be drawn down to the cover in parts of the frame desired. When the examination of the transparencies in the frame have been concluded this frame can be readily swung out of the recess in the illuminating support and engaged by the lifting device which greatly facilitate the moving of these heavy frames without endangering the glass X-ray negatives or other transparencies and the unused frames can of course be replaced in the storage racks adjacent the illuminating support where they were used or in the other racks in line therewith through this traveling lifting device.

This invention has been disclosed in connection with a number of illustrative embodiments, forms, materials, parts, arrangements and devices, to the details of which disclosure the invention is not of course to be limited, since what is claimed as new and what is desired to be secured by Letters Patent is set forth in the appended claims.

I claim—

1. In illuminating and storing apparatus adapted for X-ray negatives or other transparencies, a series of longitudinally alined bases containing frame storage racks and guides, a series of interchangeable transparency frames arranged in said storage racks and comprising a series of transverse holding strips provided with holding slots and with upper retaining or guiding slots to accommodate the transparencies and allow their ready insertion and removal, lifting members on said frames, a movable illuminating support mounted to slide transversely on each of said bases and expose the frames in the corresponding storage rack, each of said supports comprising an inclined diffusing illuminating surface, an inclined recessed frame support adjacent said illuminating surface, lights arranged within said support and adjustable diffusing shades between said lights and said illuminating surfaces, an automatically raising lifting device coöperating with said bases and comprising a traveling carriage mounted on a track extending longitudinally above said bases, a lifting cord extending along said track, a lifting weight connected to said cord and mounted in a pneumatic cushioning cylinder, an automatically closing cushioning valve and a throttling valve coöperating with said cushioning cylinder to cushion the descent of said lifting weight, hanger pulleys connected to said carriage with which said cord coöperates and a lifting pulley engaged by the loop of cord between said hanger pulleys and a connected lifting member to removably engage the lifting members in said frames and automatically lift one of said frames and hold the same in suspended position adjacent said recessed frame supports and allow the movement of said frame longitudinally of said bases.

2. In illuminating and storing apparatus adapted for X-ray negatives or other transparencies, a series of longitudinally alined bases containing frame storage racks, a series of interchangeable transparency frames arranged in said storage racks to accommodate the transparencies and allow their ready insertion and removal, lifting members on said frames, a movable illuminating support mounted to slide transversely on each of said bases and expose the frames in the corresponding storage rack, each of said supports comprising an inclined diffusing illuminating surface, an inclined recessed frame support adjacent said illuminating surface, lights arranged within said support, an automatically raising lifting device coöperating with said bases and comprising a traveling carriage mounted on a track above said bases, a lifting cord extending along said track, a lifting weight connected to said cord and mounted in a pneumatic cushioning cylinder, an automatically closing cushioning valve and a throttling valve coöperating with said cushioning cylinder to cushion the descent of said lifting weight, hanger pulleys connected to said carriage with which said cord coöperates and a lifting pulley engaged by the loop of cord between said hanger pulleys and a connected lifting member to removably engage the lifting members in said frames and automatically lift one of said frames and hold the same in suspended position adjacent said recessed frame supports and allow the movement of said frame longitudinally of said bases.

3. In illuminating and storing apparatus adapted for X-ray negatives or other transparencies, a series of bases containing frame storage racks, a series of interchangeable transparency frames arranged in said storage racks to accommodate the transparencies and allow their ready insertion and removal, lifting members on said frames, a movable illuminating support mounted to slide transversely on each of said bases and expose the frames in the corresponding storage rack, each of said supports comprising an inclined diffusing illuminating surface, an inclined recessed frame support adjacent said illuminating surface, lights arranged within said support, an automatically raising lifting device coöperating with said bases and comprising a traveling carriage mounted on a track above said bases, a lifting cord extending along said track, a lifting element connected to said cord and mounted in an element cushioning cylinder, hanger pulleys connected to said carriage with which said cord coöperates and a lifting pulley engaged by the loop of cord between said hanger pulleys and a connected lifting member to removably engage the lifting members in said frames and automatically lift one of said frames and hold the same in suspended position adjacent said recessed frame supports and allow the movement of said frame longitudinally of said bases.

4. In illuminating and storing apparatus adapted for X-ray negatives or other transparencies, a series of bases containing frame storage racks, a series of interchangeable transparency frames arranged in said storage racks to accommodate the transparencies and allow their ready insertion and removal, lifting members on said frames, a movable illuminating support mounted to expose the frames in the corresponding storage rack, each of said supports comprising a diffusing illuminating surface, a recessed frame support adjacent said illuminating surface, lights arranged within said support, an automatically raising lifting device coöperating with said bases and comprising a traveling carriage mounted on a track above said bases, a lifting cord extending along said track, a lifting element connected to said cord, hanger pulleys connected to said carriage with which said cord coöperates and a lifting pulley engaged by the loop of cord between said hanger pulleys and a connected lifting member to removably engage the lifting members in said frames and automatically lift one of said frames and hold the same in suspended position adjacent said recessed frame supports and allow the movement of said frame longitudinally of said bases.

5. In illuminating and storing apparatus adapted for X-ray negatives or other transparencies, a series of bases containing frame storage racks, a series of interchangeable transparency frames arranged in said storage racks to accommodate the transparencies and allow their ready insertion and removal, lifting members on said frames, a movable illuminating support mounted to expose the frames in the corresponding storage rack, each of said supports comprising diffusing illuminating surface, a recessed frame support adjacent said illuminating surface, lights arranged within said support, an automatically raising lifting device coöperating with said bases to removably engage the lifting members in said frames and automatically lift one of said frames and hold the same in suspended position adjacent said recessed frame supports and allow the movement of said frame longitudinally of said bases.

6. In illuminating and storing apparatus adapted for X-ray negatives or other transparencies, a series of longitudinally arranged frame storage racks, a series of interchangeable transparency frames arranged in said storage racks and provided with holding slots and with upper retaining devices to accommodate the transparencies and allow their ready insertion and removal, lifting members on said frames, illuminating supports movably mounted to coöperate with said storage racks and expose the frames therein, each of said supports comprising an inclined diffusing illuminating surface, an inclined recessed frame support adjacent each of said illuminating surfaces, lights arranged adjacent said illuminating surfaces, and an automatically raising traveling lifting device coöperating with said racks and supports to lift said frames and hold the same in suspended position adjacent said recessed frame supports and allow the movement of said frame longitudinally of said racks.

7. In illuminating and storing apparatus adapted for X-ray negatives or other transparencies, a series of longitudinally arranged frame storage racks, a series of interchangeable transparency frames arranged in said storage racks and provided with retaining devices to accommodate the transparencies and allow their ready insertion and removal, lifting members on said frames, illuminating supports movably mounted to coöperate with said storage racks and expose the frames therein, each of said supports comprising a diffusing illuminating surface, a frame support adjacent each of said illuminating surfaces, lights adjacent said illuminating surfaces, and a lifting device coöperating with said racks and supports to lift said frames and hold the same in suspended position adjacent said frame supports and allow the movement of said frame longitudinally of said racks.

8. In illuminating and storing apparatus adapted for X-ray negatives or other transparencies, a series of longitudinally arranged frame storage racks, a series of interchangeable transparency frames arranged in said storage racks and provided with retaining devices to accommodate the transparencies and allow their ready insertion and removal, lifting members on said frames, illuminating supports mounted to coöperate with said storage racks, each of said supports comprising a diffusing illuminating surface, a frame support adjacent each of said illuminating surfaces, lights arranged adjacent said illuminating surfaces, and a traveling lifting device coöperating with said racks and supports to lift said frames and hold the same in suspended position adjacent said frame supports and allow the movement of said frame longitudinally of said racks.

9. In illuminating and storing apparatus adapted for X-ray negatives or other transparencies, a series of longitudinally arranged frame storage racks, a series of interchangeable transparency frames arranged in said storage racks and provided with retaining devices to accommodate the transparencies and allow their ready insertion and removal, illuminating supports mounted to coöperate with said storage racks, each of said supports comprising a diffusing illuminating surface, a frame support adjacent each of said illuminating surfaces and lights arranged adjacent said illuminating surfaces.

10. In illuminating and storing apparatus adapted for X-ray negatives or other transparencies, a base comprising a frame storage rack, a series of interchangeable transparency frames arranged in said storage rack and comprising a series of transverse holding strips provided with holding slots and with upper retaining or guiding slots to accommodate the transparencies and allow their ready insertion and removal, lifting clips on said frames adjacent the center of their upper edge, an illuminating support mounted to expose the frames in the storage rack, said support comprising on each side an inclined diffusing illuminating surface, an inclined recess frame support adjacent said illuminating surface, an opaque screen adjacent the top of each of said illuminating surfaces, lights arranged within said support and adjustable diffusing shades between said lights and said illuminating surfaces and an automatically raising lifting device coöperating with said base comprising a lifting cord and a lifting weight connected to one end of said cord and mounted in a pneumatic cushioning cylinder and a manually operated lifting drum connected to the other end of said lifting cord.

11. In illuminating and storing apparatus, adapted for X-ray negatives or other transparencies, a series of interchangeable transparency frames comprising a series of transverse holding strips provided with holding slots and with upper retaining or guiding slots to accommodate the transparencies and allow their ready insertion and removal, lifting clips on said frames adjacent the center of their upper edge, an illuminating support comprising on each side an inclined diffusing illuminating surface, an inclined recessed frame support adjacent said illuminating surface, an opaque screen adjacent the top of each of said illuminating surfaces, lights arranged within said support and adjustable diffusing shades between said lights and said illuminating surfaces and an automatically raising lifting device coöperating with said base comprising a lifting cord and a lifting weight connected to said cord and mounted in a pneumatic cushioning cylinder.

12. In illuminating and storing apparatus adapted for X-ray negatives or other transparencies, a series of interchangeable transparency frames comprising a series of transverse holding strips provided with holding slots and with upper retaining or guiding slots to accommodate the transparencies and allow their ready insertion and removal, lifting clips on said frames, an illuminating support comprising on each side an inclined diffusing illuminating surface, an inclined recessed frame support adjacent said illuminating surface, an opaque screen adjacent the top of each of said illuminating surfaces, lights arranged within said support and an automatically raising lifting device coöperating with said base and comprising a lifting cord and a lifting weight connected to said cord and mounted in a pneumatic cushioning cylinder.

13. In illuminating and storing apparatus adapted for X-ray negatives or other transparencies, a series of interchangeable transparency frames provided with holding slots and with upper retaining or guiding slots to accommodate the transparencies and allow their ready insertion and removal, lifting clips on said frames, an illuminating support comprising on each side a diffusing illuminating surface, a recessed frame support adjacent said illuminating surface, an opaque screen adjacent the top of each of said illuminating surfaces, lights arranged within said support and an automatically raising lifting device coöperating with said base and comprising a lifting cord and a lifting weight connected to said cord and mounted in a cushioned cylinder.

14. In illuminating and storing apparatus adapted for X-ray negatives or other transparencies, a series of interchangeable transparency frames provided with holding slots and with upper retaining or guiding slots to accommodate the transparencies and allow their ready insertion and removal, lifting clips on said frames, an illuminating support comprising on each side a diffusing illuminating surface, a recessed frame support adjacent said illuminating surfaces, an opaque screen adjacent the top of each of said illuminating surfaces, lights arranged within said support and an automatically raising lifting device.

15. In illuminating and storing apparatus adapted for X-ray negatives or other transparencies, a series of interchangeable transparency frames comprising a series of transverse holding strips provided with holding slots and with upper retaining or guiding slots to accommodate the transparencies and allow their ready insertion and removal, lifting clips on said frames, an illuminating support comprising on each side an inclined diffusing illuminating surface, an inclined frame support adjacent said illuminating surface, an opaque screen adjacent the top of each of said illuminating surfaces, and lights arranged within said support.

16. In illuminating and storing apparatus adapted for X-ray negatives or other transparencies, a series of interchangeable transparency frames provided with holding slots and with upper retaining or guiding slots to accommodate the transparencies and allow their ready insertion and removal, lifting clips on said frames, an illuminating support comprising on each side a diffusing illuminating surface, a frame support adjacent said illuminating surface, an opaque screen adjacent the top of each of said illuminating surfaces and lights arranged within said support.

17. In illuminating and storing apparatus adapted for X-ray negatives or other transparencies, a base containing a frame storage rack, a series of interchangeable transparency frames arranged in said storage rack and comprising retaining devices to accommodate the transparencies and allow their ready insertion and removal, lifting members on said frames, a movable illuminating support mounted to slide transversely on said base and expose the frames in said storage rack, said support comprising a diffusing illuminating surface, an inclined recessed frame support adjacent said illuminating surface, lights arranged to coöperate with said illuminating surface, and automatically raising lifting devices coöperating with said base and support.

18. In illuminating and storing apparatus adapted for X-ray negatives or other transparencies, a base containing a frame storage rack, a series of interchangeable transparency frames arranged in said storage rack and comprising retaining devices to accommodate the transparencies and allow their ready insertion and removal, lifting members on said frames, a movable illuminating support mounted to slide on said base and expose the frames in said storage rack, said support comprising a diffusing illuminating surface, an inclined recessed frame support adjacent said illuminating surface, lights arranged to coöperate with said illuminating surface and automatically raising lifting devices coöperating with said base and support.

19. In illuminating and storing apparatus adapted for X-ray negatives or other transparencies, a base containing a frame storage rack, a series of interchangeable transparency frames arranged in said storage rack and comprising retaining devices to accommodate the transparencies and allow their ready insertion and removal, a movable illuminating support mounted to expose the frames in said storage rack, said support comprising an illuminating surface, a frame support adjacent said illuminating surface, lighting means arranged to coöperate with said illuminating surface and lifting devices coöperating with said base and support.

20. In illuminating and storing apparatus adapted for X-ray negatives or other transparencies, a frame storage rack, a series of interchangeable transparency frames arranged in said storage rack and comprising retaining devices to accommodate the transparencies and allow their ready insertion and removal, an illuminating support movably mounted to coöperate with said storage rack to expose the frames therein, said support comprising an illuminating surface, an inclined recessed frame support coöperating with said illuminating surface, and lighting means arranged to coöperate with said illuminating surface.

21. In illuminating and storing apparatus adapted for X-ray negatives or other transparencies, a frame storage rack, a series of interchangeable transparency frames arranged in said storage rack and comprising retaining devices to accommodate the transparencies and allow their ready insertion and removal, an illuminating support mounted to coöperate with said storage rack, said support comprising an illuminating surface, a frame support coöperating with said illuminating surface, and lighting means arranged to coöperate with said illuminating surface.

EUGENE W. CALDWELL.

Witnesses:
HARRY L. DUNCAN,
JESSIE B. KAY.

Copies of this patent may be obtained for five cents each, by addressing the "Commissioner of Patents, Washington, D. C."